L. H. OBERREICH.
SHOCK ABSORBER.
APPLICATION FILED JULY 18, 1919.
1,385,705.
Patented July 26, 1921.
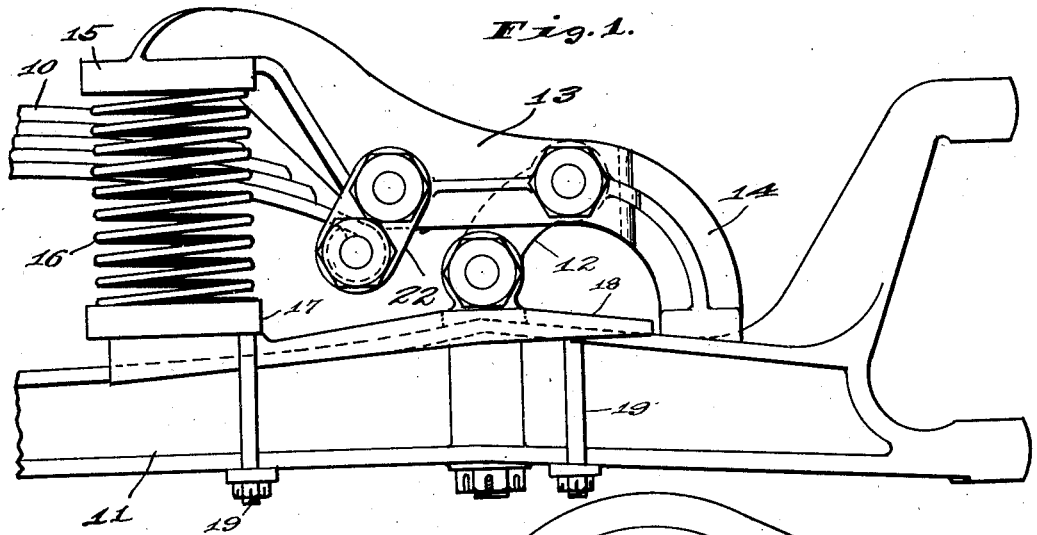
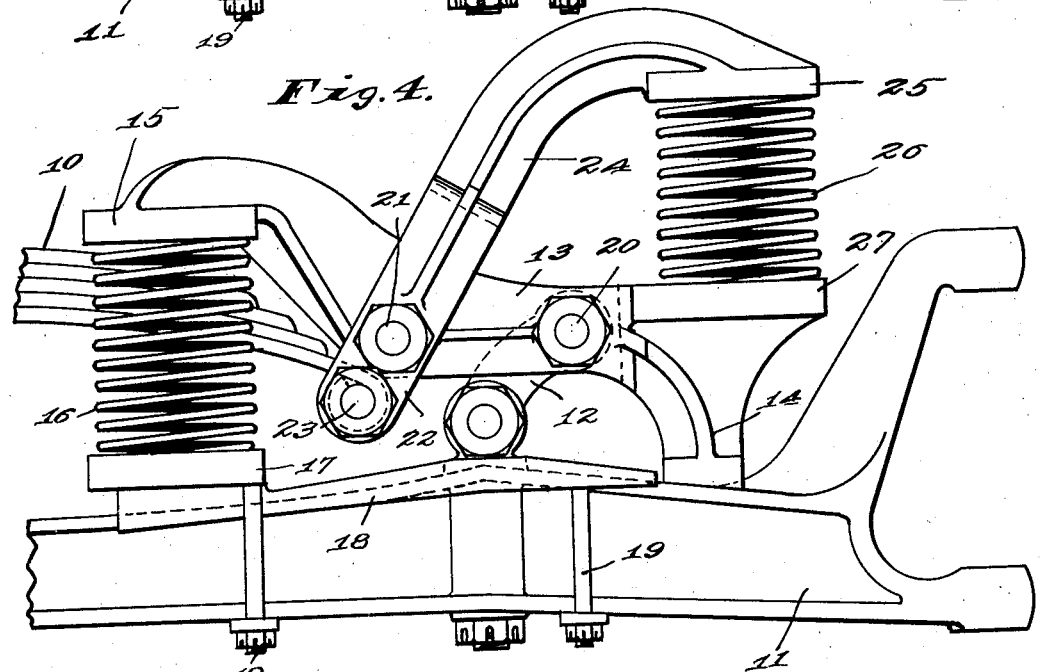
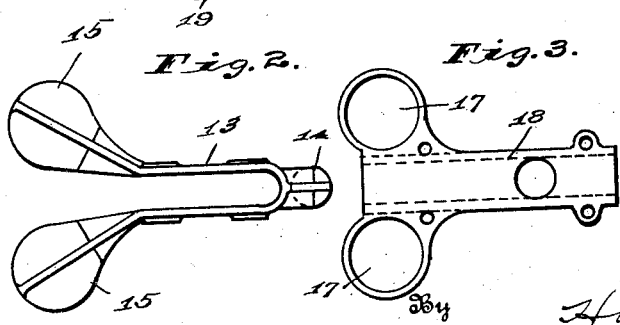
Inventor
Louie H. Oberreich,
By Hood & Schley
Attorneys

UNITED STATES PATENT OFFICE.

LOUIE H. OBERREICH, OF INDIANAPOLIS, INDIANA.

SHOCK-ABSORBER.

1,385,705.   Specification of Letters Patent.   Patented July 26, 1921.

Application filed July 18, 1919. Serial No. 311,864.

*To all whom it may concern:*

Be it known that I, LOUIE H. OBERREICH, a citizen of the United States, residing at Indianapolis, in the county of Marion and State of Indiana, have invented a new and useful Shock-Absorber, of which the following is a specification.

It is the object of my invention to provide a simple shock absorber, which can be applied to Ford cars without requiring any material change in the spring and axle structure thereof, which cushions direct shocks and limits the movement of the shock-absorber lever upon rebound, and which may also resiliently oppose upward movement of the main spring after the rebound movement of the lever has been stopped.

The accompanying drawing illustrates my invention: Figure 1 is a fragmentary elevation of a front axle and spring of an automobile, equipped with one form of shock absorber embodying my invention, in which form there is a positive limit of the rebound; Fig. 2 is a plan, on a smaller scale, of the shock-absorber lever of Fig. 1; Fig. 3 is a plan, on a small scale, of the saddle which is mounted on the axle; and Fig. 4 is a fragmentary elevation somewhat similar to Fig. 1, but showing a slightly different form of shock absorber embodying my invention, in which form the rebound is resiliently opposed.

The main spring 10 and the front axle 11 are of standard Ford construction, and the end of the spring 10 is supported from the standard perch 12, with which the axle is provided. As shown, this perch is reversed from the position shown in the Ford car, by having the right and left hand perches interchanged, so that the perch projects from the axle both upward and outward; this, however, is not essential. The end of the spring 10 and the end of the perch 12 are both provided with eyes. None of this is at all changed from standard, save for the interchange of perches as noted. In the standard construction, however, the eyes of the perch and of the main spring are connected by a shackle or link. I remove that shackle or link from the eye of the perch, and may or may not remove it from the eye of the main spring, according as I use the form shown in Fig. 1 or the form shown in Fig. 4. In place of pivoting this link to the eye of the perch, I pivot on said perch eye, or on some other suitable support fixed on the axle, a shock-absorber lever 13. This lever extends outward to form a downwardly curved stop finger 14, which may engage the upper surface of the axle 11 to positively limit the lever movement which occurs upon rebound. The lever 13 also projects inward past the end of the main spring 10, this inwardly projecting portion being bifurcated to provide a pair of spring-seats 15 for receiving the upper ends of a pair of compression springs 16 which oppose the downward movement of the inner end of the lever 13. The lower ends of the springs 16 are received in spring-seats 17 which oppose the spring-seats 15 and which are provided in any suitable manner, as by being parts of a saddle 18 which is clamped to the axle 11 in any suitable manner, as by clamping bolts 19. Between its pivot point 20 on the perch 12 and the spring-seats 15, the lever 13 carries a pivot pin 21 to which is attached a link 22, which is also connected to the pivot pin 23 in the eye of the main spring 10. This link 22 may be the link which in the original car connected the eyes of the main spring and of the perch; this construction is shown in Fig. 1. On the other hand, it may be a different link, formed with an upwardly projecting and outwardly curved arm 24 in addition to the link portion, as is shown in Fig. 4; in this case, the free end of the arm 24 is provided with a downwardly facing spring-seat 25 which receives the upper end of a compression spring 26, the lower end of which is received in a spring-seat 27 opposing the spring-seat 25 and forming part of the lever 13 on which it is located just above the stop arm 14.

In operation: When the main spring 10 is pushed down toward the axle 11, it spreads its ends to turn the link 22, and also forces downward the inner end of the shock-absorber lever 13, to compress the springs 16. The opposition which the springs 16 offer to this depression of the inner end of the lever 13, cushions the shock. On the rebound, however, the lever 13 turns in the opposite direction, the shock-absorber springs 16 expand, and the ends of the main spring 10 approach each other; this movement of the lever 13 may continue until the stop finger 14 engages the axle, which engagement may stop the movement of the lever 13 and also tends somewhat to stop the rebound. It does not positively stop the rebound, however, but allows the rebound to continue to some extent by the turning of the link 22 on its pivot pins 21 and 23 and the resultant coming together of the ends of the link spring. This turning movement of the link 22 is unopposed in the arrangement shown in Fig. 1, save by the resistance which the spring 10 may offer by the forcing together of its ends; but in the arrangement shown in Fig. 4, this turning movement of the link 22 is resiliently opposed by the action of the rebound spring 26 on the arm 24.

I claim as my invention:

1. In combination with the main spring and axle of an automobile, a lever having a fixed pivotal support upon said axle beyond the end of the main spring, a link connecting said lever to the main spring, a spring acting between said lever and said axle and resiliently opposing the lever movement which occurs when the main spring and axle are pushed together, said lever being free from spring opposition to its movement in the opposite direction, and a stop for limiting the movement of said lever in the opposite direction.

2. In combination with the main spring and axle of an automobile, a lever having a fixed pivotal support upon said axle beyond the end of the main spring, a link connecting said lever to the main spring, a spring acting between said lever and said axle and resiliently opposing the lever movement which occurs when the main spring and axle are pushed together, said lever being free from spring opposition to its movement in the opposite direction, and a stop finger projecting outwardly and downwardly from said lever and arranged to engage the upper face of the axle upon movement of said lever in the other direction.

3. In combination with the main spring and axle of an automobile, a lever pivotally supported from said axle, a link connecting said lever to the main spring, a spring acting between said lever and said axle resiliently opposing the lever movement which occurs when the main spring and axle are pushed together, a stop for limiting the movement of said lever in the opposite direction, and a spring acting between said link and said lever to oppose the link turning which occurs upon rebound.

4. In combination with the main spring and axle of an automobile, a lever pivotally supported from said axle, a link connecting said lever to the main spring, a spring acting between said lever and said axle resiliently opposing the lever movement which occurs when the main spring and axle are pushed together, a stop finger projecting outwardly and downwardly from said lever and arranged to engage the upper face of the axle upon movement of said lever in the other direction, and a spring acting between said link and said lever to oppose the link turning which occurs upon rebound.

5. In combination with the main spring and axle of an automobile, a lever having a fixed pivotal support upon said axle beyond the end of the main spring, a link connecting said lever to the main spring, a spring acting between said lever and said axle resiliently opposing the lever movement which occurs when the main spring and axle are pushed together, and a stop for limiting the movement of said lever in the opposite direction.

6. In combination with the main spring and axle of an automobile, a lever having a fixed pivotal support upon said axle beyond the end of the main spring, a link connecting said lever to the main spring, a spring acting between said lever and said axle resiliently opposing the lever movement which occurs when the main spring and axle are pushed together, and a stop finger projecting outwardly and downwardly from said lever and arranged to engage the upper face of the axle upon movement of said lever in the other direction.

7. In combination with the main spring and axle of an automobile, a lever pivotally supported from said axle, a link connecting said lever to the main spring, a spring acting on said lever resiliently opposing the lever movement which occurs when the main spring and axle are pushed together, a stop for limiting the movement of said lever in the opposite direction, and a spring acting on said link to oppose the link turning which occurs upon rebound.

8. In combination with the main spring and axle of an automobile, a lever pivotally supported from said axle, a link connecting said lever to the main spring, a spring acting on said lever resiliently opposing the lever movement which occurs when the main spring and axle are pushed together, a stop finger projecting outwardly and downwardly from said lever and arranged to engage the upper face of the axle upon movement of said lever in the other direction, and a spring acting on said link to oppose the link turning which occurs upon rebound.

In witness whereof, I have hereunto set my hand at Indianapolis, Indiana, this twelfth day of July, A. D. one thousand nine hundred and nineteen.

LOUIE H. OBERREICH.